US012606470B2

(12) United States Patent
Momotani et al.

(10) Patent No.: US 12,606,470 B2
(45) Date of Patent: Apr. 21, 2026

(54) UREA TREATMENT METHOD AND DEVICE

(71) Applicant: ORGANO CORPORATION, Tokyo (JP)

(72) Inventors: Naonori Momotani, Tokyo (JP); Kazushige Takahashi, Tokyo (JP); Yoshiaki Hasebe, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 357 days.

(21) Appl. No.: 18/037,886

(22) PCT Filed: Sep. 27, 2021

(86) PCT No.: PCT/JP2021/035323
§ 371 (c)(1),
(2) Date: May 19, 2023

(87) PCT Pub. No.: WO2022/107451
PCT Pub. Date: May 27, 2022

(65) Prior Publication Data
US 2024/0010531 A1 Jan. 11, 2024

(30) Foreign Application Priority Data
Nov. 20, 2020 (JP) ................................. 2020-193011

(51) Int. Cl.
*C02F 1/76* (2023.01)
*C02F 101/38* (2006.01)
*C02F 103/04* (2006.01)

(52) U.S. Cl.
CPC ............ *C02F 1/76* (2013.01); *C02F 2101/38* (2013.01); *C02F 2103/04* (2013.01); *C02F 2209/003* (2013.01)

(58) Field of Classification Search
None
See application file for complete search history.

(56) References Cited

U.S. PATENT DOCUMENTS

2005/0147528 A1 7/2005 Shim et al.
2010/0187175 A1* 7/2010 Kolios ................... C01B 11/20
210/188
(Continued)

FOREIGN PATENT DOCUMENTS

CN 1646011 A 7/2005
CN 102781849 A 11/2012
(Continued)

OTHER PUBLICATIONS

MT JP 2019063768 (Year: 2019).*
(Continued)

*Primary Examiner* — Peter Keyworth
(74) *Attorney, Agent, or Firm* — Greenblum & Bernstein, P.L.C.

(57) ABSTRACT

A urea treatment method in which hypobromite ions are generated by adding a chlorine-based oxidizer and a bromide salt to to-be-treated water containing urea so as to break down the urea in the to-be-treated water and obtain treated water, the method including: a) determining the free residual bromine concentration and the free residual chlorine concentration in the treated water; and b) controlling the added amount of the chlorine-based oxidizer and the bromide salt on the basis of the free residual bromine concentration and the free residual chlorine concentration. The device includes a bromide salt adding means, a chlorine-based oxidizer adding means, a urea decomposition tank, a residual chlorine meter, and a control device for controlling the added amount of the chlorine-based oxidizer by the chlorine-based oxidizer adding means on the basis of the method.

12 Claims, 3 Drawing Sheets

(56)  References Cited

U.S. PATENT DOCUMENTS

| | | |
|---|---|---|
| 2011/0318237 A1 | 12/2011 | Woodling et al. |
| 2013/0048558 A1 | 2/2013 | Arai et al. |

FOREIGN PATENT DOCUMENTS

| | | |
|---|---|---|
| CN | 103313731 A | 9/2013 |
| CN | 111252955 A | 6/2020 |
| JP | 9-94585 A | 4/1997 |
| JP | 2019-63768 A | 4/2019 |
| JP | 2019-100781 A | 6/2019 |
| WO | 2011/162877 A1 | 12/2011 |

OTHER PUBLICATIONS

MT JP2019100781 (Year: 2019).*

Taiwanese Office Action dated Dec. 27, 2024 in Taiwanese family member Patent Application No. 110142328, with English language translation thereof.

International Search Report issued Nov. 9, 2021 in International Bureau of WIPO Patent Application No. PCT/JP2021/035323, along with an English translation thereof.

Written Opinion issued Nov. 9, 2021 in International Bureau of WIPO Patent Application No. PCT/JP2021/035323, along with an English translation thereof.

Office Action, dated Mar. 19, 2025, in Chinese family member application No. 202180078138.1 with English language translation thereof.

* cited by examiner

UREA TREATMENT METHOD AND DEVICE

TECHNICAL FIELD

This invention relates to a urea treatment method and device that decomposes urea in pre-treated water to obtain treated water.

BACKGROUND ART

Ultrapure water is generally produced by treating raw water, such as industrial water, city water, or well water, in a pre-treatment system, then treating it in a primary pure water system to obtain pure water (primary pure water), which is then treated in a secondary pure water system (subsystem). In the production of ultrapure water, sodium bromide (NaBr) and sodium hypochlorite (NaClO) are added to pre-treated water, and the hypobromite ions produced are used to decompose urea in the pre-treated water.

With regard to such a method, Patent Document 1 discloses measuring the concentration of free residual chlorine in the effluent of the urea decomposition process and controlling the amount of hypochlorite added based on this measured value. The purpose of this method is to decompose and remove urea stably and reliably without increasing the cost of treatment by adding the necessary chemicals for urea decomposition without excess or deficiency, even when reaction inhibitors such as ammonia are contained in the water to be treated.

CITATION LIST

Prior Art Literature

Patent Document 1: JP 2019-63768 A

SUMMARY OF THE INVENTION

Technical Problem

Patent document 1 states that "free residual chlorine concentration" was measured by a residual chlorine meter. However, the measured value obtained by the residual chlorine meter (the indicated value of the residual chlorine meter) actually includes not only the free chlorine concentration but also the free bromine concentration. Therefore, in the method disclosed in Patent Document 1, where the amount of NaClO added is determined based on the indicated value of the residual chlorine meter, the appropriate amount of NaClO may not be added because the accurate free chlorine concentration is not measured.

The purpose of the present invention is to provide a urea treatment method and device that can optimize the amount of chlorine oxidizers such as NaClO required for urea decomposition.

Measure to Solve the Problem

According to an aspect of the present invention, a urea treatment method in which a bromide salt and a chlorine-based oxidant are added to pre-treated water containing urea to generate hypobromite ions to decompose urea in the pre-treated water to obtain treated water, comprising (a) determining the concentration of residual free bromine and residual free chlorine in said treated water, respectively; and (b) controlling the amount of bromide salt and chlorine-based oxidizer added based on the residual free bromine and residual free chlorine concentrations.

According to another aspect of the invention, a urea treatment device is provided having a bromide salt adding means for adding bromide salt to pre-treated water containing urea, a chlorine-based oxidizer adding means for adding a chlorine-based oxidizer to said pre-treated water, a urea decomposition tank in which said pre-treated water reacts with said bromide salt and chlorine-based oxidizer to obtain treated water, and a residual chlorine meter for measuring residual chlorine in said treated water, wherein calculating the residual free chlorine concentration in said sample from a first measurement of a sample obtained from said treated water by said residual chlorine meter and a second measurement of said sample by said residual chlorine meter after glycine is added to said sample, and based on said first measurement, said second measurement, and said residual free chlorine concentration a controller that controls at least one of the amount of said bromide salt added by the bromide salt adding means and the amount of said chlorine-based oxidizing agent added by the chlorine-based oxidizing agent adding means.

Effects of the Invention

The amount of chlorine-based oxidizer added for urea decomposition can be optimized.

DESCRIPTION OF EMBODIMENTS

One aspect of the invention relates to a urea treatment method in which a bromide salt and a chlorine-based oxidant are added to treated water containing urea to generate hypobromite ions, thereby decomposing urea in the treated water to obtain treated water.

Figure 1:
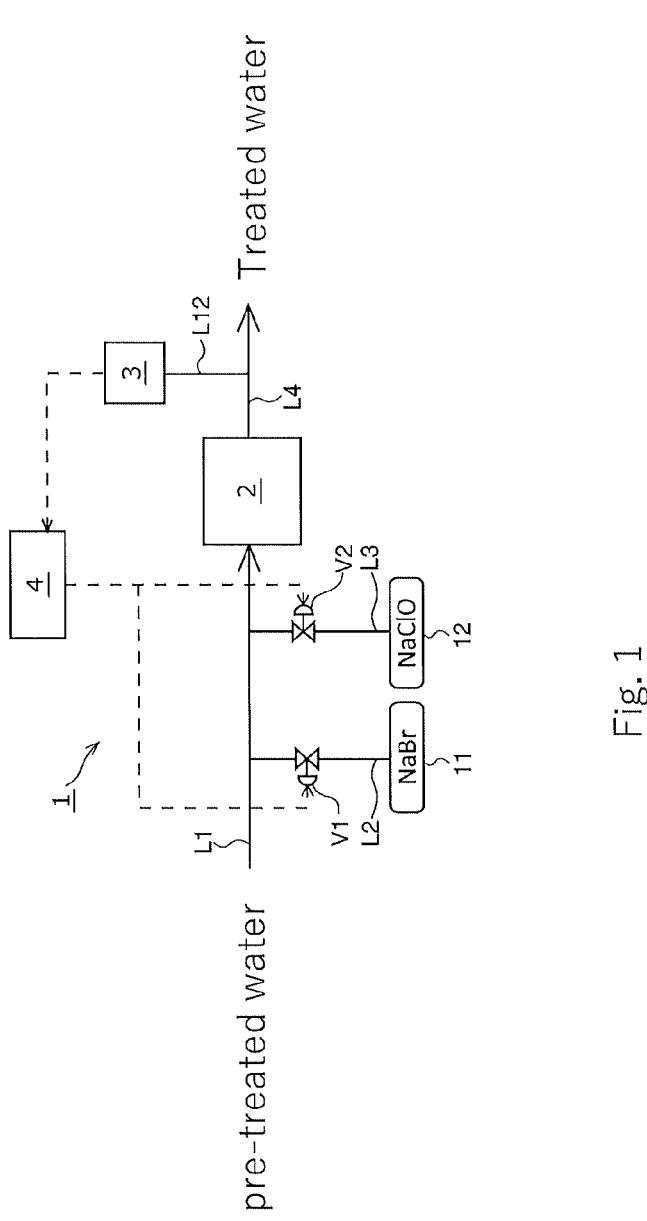
FIG. 1: Process flow diagram showing an example of the schematic configuration of the urea treatment device of the present invention.

FIG. 1 is a process flow diagram showing an example of a schematic configuration of a urea treatment device in the urea decomposition method of the present invention.

Urea treatment device 1 consists of a bromide salt adding means 11 for adding bromide salt to pre-treated water containing urea, a chlorine-based oxidizer adding means 12 for adding a chlorine-based oxidizer to said pre-treated water, a urea decomposition tank 2 for storing treated water to which said bromide salt and chlorine-based oxidizer have been added and reacting the urea in the pre-treated water with said bromide salt and chlorine-based oxidizer to obtain treated water, a residual chlorine meter 3 for measuring the amount of residual chlorine in the treated water obtained by said reaction, and a control means 4 that controls the amount of bromide salt and chlorine-based oxidizer added based on the measured value by the residual chlorine meter 3. In FIG. 1, pre-treated water containing urea in line L1 is fed to urea decomposition tank 2 with bromide salt added by bromide salt adding means 11 and chlorine-based oxidizer added by chlorine-based oxidizer adding means 12. Pre-treated water in the urea decomposition tank 2 reacts with the said bromide salts and the said chlorine-based oxidizer to decompose urea, which is discharged from line L4 as treated water. A residual chlorine meter 3 is connected to line L4 to measure the chlorine concentration (residual chlorine concentration) in the treated water. Control means 4 controls the amount of bromide salt added by bromide salt adding means 11 and the amount of chlorine-based oxidizer added by chlorine-based oxidizer adding means 12 based on the residual free bromine concentration and residual free chlorine concentration calculated from the residual chlorine meter 3 measurements.

As pre-treated water, water containing urea can be used as appropriate, for example, raw water for ultrapure water production such as industrial water, city water, well water, etc. can be used as appropriate. Urea is contained in the pre-treated water, e.g., 10 to 200 μg/L. By urea treatment, the concentration of urea in the treated water obtained is, for example, less than 1 μg/L.

Bromide salts to be added include sodium bromide (NaBr) and potassium bromide (KBr). Chlorine-based oxidizers include sodium hypochlorite (NaClO), sodium perchlorate (NaClO$_4$), and calcium hypochlorite (Ca(ClO)$_2$). The following description is representative of the case where NaBr and NaClO are used as the urea decomposition reaction.

Generally, residual chlorine meters are said to measure free chlorine concentration (displayed as an indicated value), but the inventors have found that when urea in pre-treated water containing urea is decomposed to obtain treated water by adding bromide salt and a chlorine-based oxidant to the pre-treated water to generate hypobromite ions, free bromine is contained in the treated water Since the residual chlorine meter displays the sum of the free bromine and free chlorine concentrations as the residual chlorine concentration, it does not indicate the exact concentration of free chlorine. Therefore, we found that if the amount of NaClO added is controlled based on the measured value (indicated value) of the residual chlorine meter, the appropriate amount of NaClO may not be added, and as a result, the appropriate amount of NaBr may also not be added, which may affect the urea decomposition reaction, such as taking longer time. Therefore, in the present invention, the free bromine and free chlorine concentrations are calculated from the residual chlorine meter readings (indicated values), and the amount of NaBr and NaClO added is controlled based on the obtained free bromine and free chlorine concentrations.

In the present invention, "residual chlorine concentration" refers to the value measured by a residual chlorine meter (the indicated value of the residual chlorine meter), and "residual free chlorine concentration" refers to the value measured by a residual chlorine meter (the indicated value of the residual chlorine meter, i.e., "free residual chlorine concentration" in the patent document 1) minus residual free bromine concentration.

Next, the control of the amount of NaBr and NaClO added in the present invention is explained.

The reaction of NaBr with NaClO produces hypobromite ions, and urea is decomposed by the hypobromite ions.

The reaction resulting in the formation of hypobromite ion (BrO⁻) from NaBr and NaClO is considered to follow the following equation.

$$NaBr + NaClO \rightarrow 2Na^+ + BrO^- + Cl^- \qquad \text{(Equation 1)}$$

The urea decomposition reaction by hypobromite ions is considered to follow the following equation $$(NH_2)_2CO + 3BrO^- \rightarrow N_2 + CO_2 + 2H_2O + 3Br^- \qquad \text{(Equation 2)}$$

From Equations 1 and 2, the following equation follows $$(NH_2)_2CO + 3NaClO \rightarrow N_2 + CO_2 + 2H_2O + 3Na^+ + 3Cl^- \qquad \text{(Equation 3)}$$

BrO⁻ concentration does not change before and after the urea decomposition reaction and is considered to be practically constant.

When NaBr and NaClO are added to pre-treated water containing urea and allowed to react, and a portion of the resulting treated water is collected and measured with a residual chlorine meter as sample water, the measured value (indicated value) is obtained as the sum of the free bromine concentration and free chlorine concentration. On the other hand, a predetermined compound (a compound with an amino group) is added to the sample water to change the free chlorine in the sample water to bound chlorine. Since the residual chlorine meter cannot detect bound chlorine as a measurement value, the value (indicated value) measured by the residual chlorine meter of sample water to which a given compound is added is the free bromine concentration. Therefore, the difference (A–B) between the residual chlorine meter reading A (the sum of the free bromine and free chlorine concentrations) of the sample water before the addition of the prescribed compound and the residual chlorine meter reading B (free bromine concentration) of the sample water after the addition of the compound having amino groups is the free chlorine concentration in the treated water.

The prescribed compounds are not limited to those that change free chlorine to bound chlorine, but include, for example, compounds with amino groups. Compounds with amino groups can be any organic compound with amino groups in its molecular structure, such as alanine, arginine, asparagine, aspartic acid, cysteine, cystine, glutamine, glutamic acid, glycine, histidine, isoleucine, leucine, lysine, methionine, phenylalanine, proline, serine, threonine, theanine, trionine, tryptophan, tyrosine, valine, and other amino acids, and aminoalkyl sulfonic acids such as taurine. Of these, glycine, arginine, asparagine, glutamine, lysine, phenylalanine, proline, serine, and taurine are preferred because of their high reactivity with hypochlorous acid or its salts, and glycine is especially preferred because of its easy availability and handling. The coexisting ammonium salt or amino group compound can be in solution form, such as an aqueous solution, or in solid or powder form.

Specific methods can be used, such as those described in JPA No. 2019-100781.

The residual free bromine concentration may also be determined by measuring it using a bromine measuring device, such as the Hanna Instruments HI96716 portable bromine analyzer.

In the present invention, the amount of NaBr and NaClO added is controlled based on the free bromine and free chlorine concentrations thus determined.

In controlling the amount of NaBr and NaClO added, we first conduct several preliminary tests to decompose urea by varying the amount of NaBr and NaClO added to the pre-treated water as parameters. Calculate the reaction rate constant for the urea decomposition reaction from the change in urea concentration over time in each preliminary test. Reaction rate constants can be calculated in a general way, for example, from the following equation.

$$C = C_0 e^{-kt} \qquad \text{(Equation 4)}$$

Here, the t: Reaction time of urea decomposition reaction

C: Urea concentration in pre-treated water (reaction solution) at reaction time t $C_0$: Initial urea concentration in pre-treated water (urea concentration at reaction time t=0)

k: Reaction rate constant for urea decomposition reaction

However, if the amount of NaBr and NaClO added to the pre-treated water changes, the reaction rate constant k also changes. In other words, the reaction rate constant k depends on the amount of NaBr and NaClO added.

The relationship between the reaction rate constant calculated from Equation 4 and the free bromine and free chlorine concentrations determined by the method described above (e.g., as a graph or formula) should be determined.

The target urea concentration in the treated water (target urea concentration) and the target reaction time (target reaction time) are set, and the reaction rate constant (target reaction rate constant) to reach the target urea concentration in the target reaction time is calculated from the urea concentration in the pre-treated water. The residual free bromine concentration (target residual free bromine concentration) and residual free chlorine concentration (target residual free chlorine concentration) in the treated water at the calculated target reaction rate constant are determined from the above relationship.

Therefore, NaBr and NaClO should be added so that the residual free bromine and residual free chlorine concentrations in the treated water are the target residual free bromine and target residual free chlorine concentrations, respectively.

Specifically, the amount of NaBr added is increased or decreased by the difference between the residual free bromine concentration in the treated water and the target residual free bromine concentration, as determined from the residual chlorine meter readings (indicated values). The amount of NaClO added is then increased or decreased by the difference between the initial amount of free chlorine added and the required amount of free chlorine added to achieve the target residual free chlorine concentration after increasing or decreasing the amount of NaBr added.

The target residual free bromine concentration can be set based on the relationship between the reaction rate constant, free bromine concentration, and free chlorine concentration described above.

The required free chlorine addition amount can be obtained from the sum of the value obtained by multiplying the target residual free bromine concentration by a predetermined value in the range of 1.2 to 1.4 (1.54 to 1.80 for Br⁻ conversion) and the target residual free chlorine concentration. The initial free chlorine addition amount can be obtained from the sum of the value obtained by multiplying the residual free bromine concentration in the treated water before the NaBr addition amount change by a predetermined value in the range of 1.2 to 1.4 and the residual free chlorine concentration at this time.

This allows the accurate concentration of residual free bromine and residual free chlorine in the treated water to be determined, and the appropriate amount of NaBr (bromide salt) and NaClO (chlorine-based oxidizer) to be added for urea decomposition.

As mentioned above, the amount of NaBr added to the pre-treated water may be kept constant, assuming that it is practically constant, since the BrO⁻ concentration does not theoretically change before and after the urea decomposition reaction. In this case, the amount of NaBr added, for example, 0.5 mg/L or more is preferable, 1 mg/L or more is more preferable, and 2 mg/L or more is even more preferable from the viewpoint of promoting urea decomposition reaction. The amount of NaBr added should be less than 3 mg/L. The urea decomposition promoting effect does not increase much even if the concentration exceeds 3 mg/L.

The concentration of NaBr added to the pre-treated water multiplied by a predetermined value in the range of 0.5 to 0.7 (0.64 to 0.90 for Br⁻ conversion) can then be adopted as the residual free bromine concentration in the treated water.

A pH of 5 to 6.5 is preferred during the urea decomposition reaction. The rate of urea decomposition tends to be faster than when the pH is neutral. Also, when the pH is alkaline, for example, about 9, the rate of urea decomposition tends to be faster than when the pH is neutral, but in this case, the pH may need to be readjusted to neutral for later stages of urea treatment (e.g., flocculation treatment). If urea decomposition is performed at a pH of 5 to 6.5, pH readjustment to bring the pH to neutral can be performed more easily than if it is performed alkaline, or pH readjustment is not necessary. In order to perform urea decomposition at the desired pH, an appropriate pH adjuster can be added to the pre-treated water as needed.

The urea decomposition reaction can be performed at room temperature (e.g., about 20° C.) and normal pressure (e.g., about 1 atm).

Figure 2:
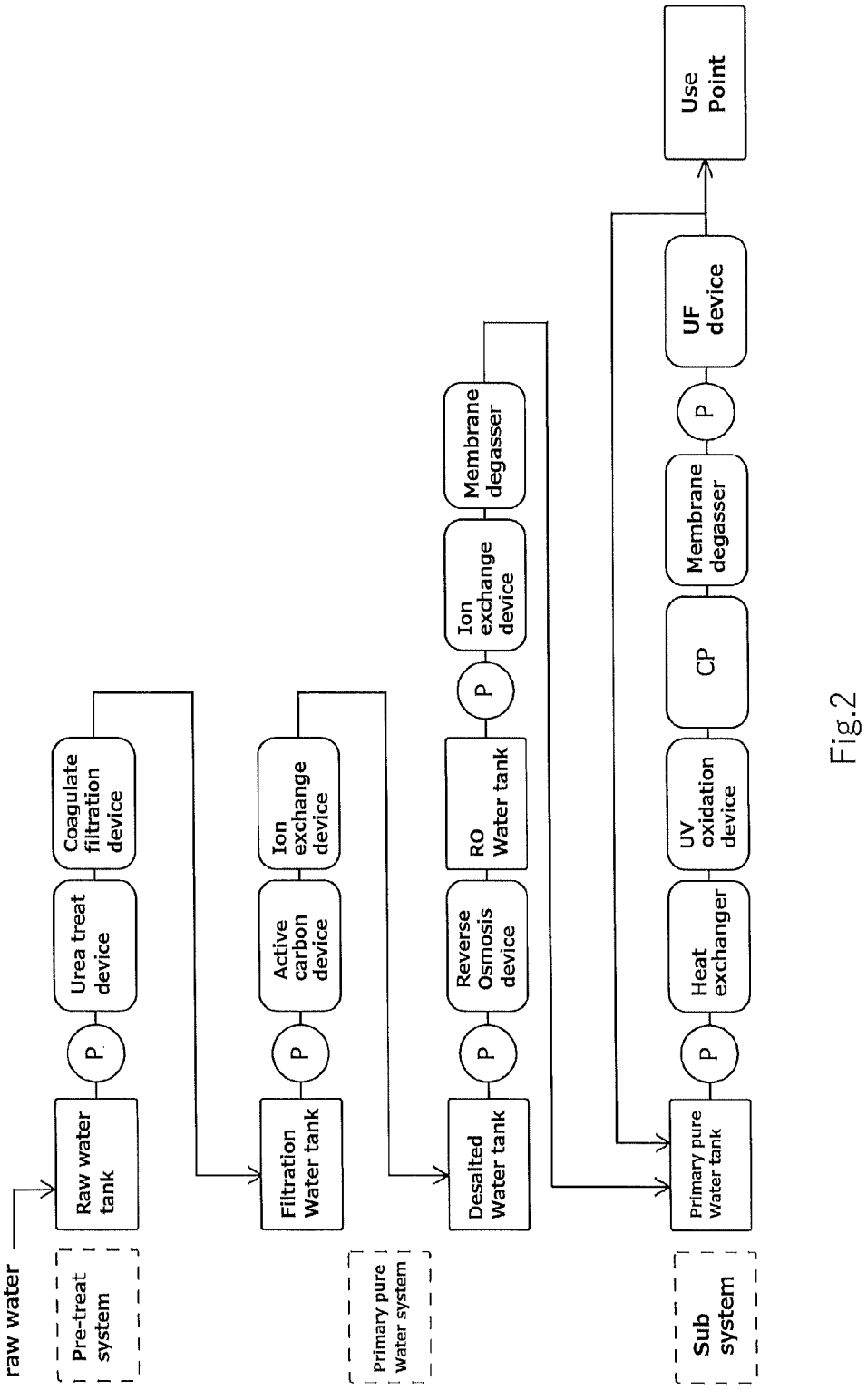
FIG. 2: Process flow diagram showing an example of a schematic configuration of an ultrapure water production system equipped with a urea treatment system of the present invention.

The urea treatment device can be used, for example, as a pretreatment for an ultrapure water production system, as shown in FIG. 2. The ultrapure water production system shown in FIG. 2 consists of a pretreatment system, a primary pure water system, and subsystems. In the pretreatment system, coagulation filtration is performed by coagulation filtration equipment. In the primary pure water system, after the pretreated filtered water has had TOC and residual salt removed by an activated carbon unit, ions are removed by an ion exchange unit to produce demineralized water, and ions and TOC are removed by a reverse osmosis membrane unit to produce RO water. Thereafter, ions are further removed by an ion exchange device, and dissolved oxygen is removed by a membrane degasser to produce primary pure water. In the subsystem, primary pure water undergoes ultraviolet (UV) oxidation to decompose TOC, ion removal by a cartridge polisher (CP: non-regenerative ion exchanger), dissolved oxygen removal by a membrane degasser, and particulate removal by an ultrafiltration membrane (UF) device before being produced into ultrapure water and sent to the use point.

In the ultrapure water production system in FIG. 2, the urea treatment unit is installed in the front stage of the coagulation and filtration unit of the pretreatment system, but it may be installed in the primary pure water system or subsystem.

EXAMPLE

The invention is described in detail below using examples, but the invention is not limited thereby.

Example 1

Urea was added to tap water from Sagamihara City, Kanagawa Prefecture, Japan to achieve a urea concentration of 100 µg/L and used as pre-treated water. In the following, unless otherwise noted, the temperature was 20° C., the pressure was nearly atmospheric, and the pH was 6 during the urea decomposition reaction. Hydrochloric acid was added as needed as a pH adjuster.

Preliminary Test

As a preliminary test, several reaction tests were conducted while varying the amount of NaBr and NaClO added to the pre-treated water as parameters.

In each reaction test, the change over time of the urea concentration C in the pre-treated water was examined, and the reaction rate constant k was calculated. The initial time point of change over time is when NaBr and NaClO are added (reaction time t=0). Urea concentration was measured using a urea meter (LC: GL Science LC800, MSMS: AB SCIEX 3200 Q TRAP). The residual free chlorine concentration of the treated water after the reaction was measured using a residual chlorine meter (product name: portable digital residual chlorine meter HI96711C, manufactured by Hanna Instruments Japan Co). When measuring the concentration of residual free bromine in the treated water, glycine (an aqueous solution of 10 g glycine dissolved in 100 mL water) was added to the water to be measured to achieve a glycine concentration of 1 g/L, and the water was stirred for 1 minute.

Figure 3:
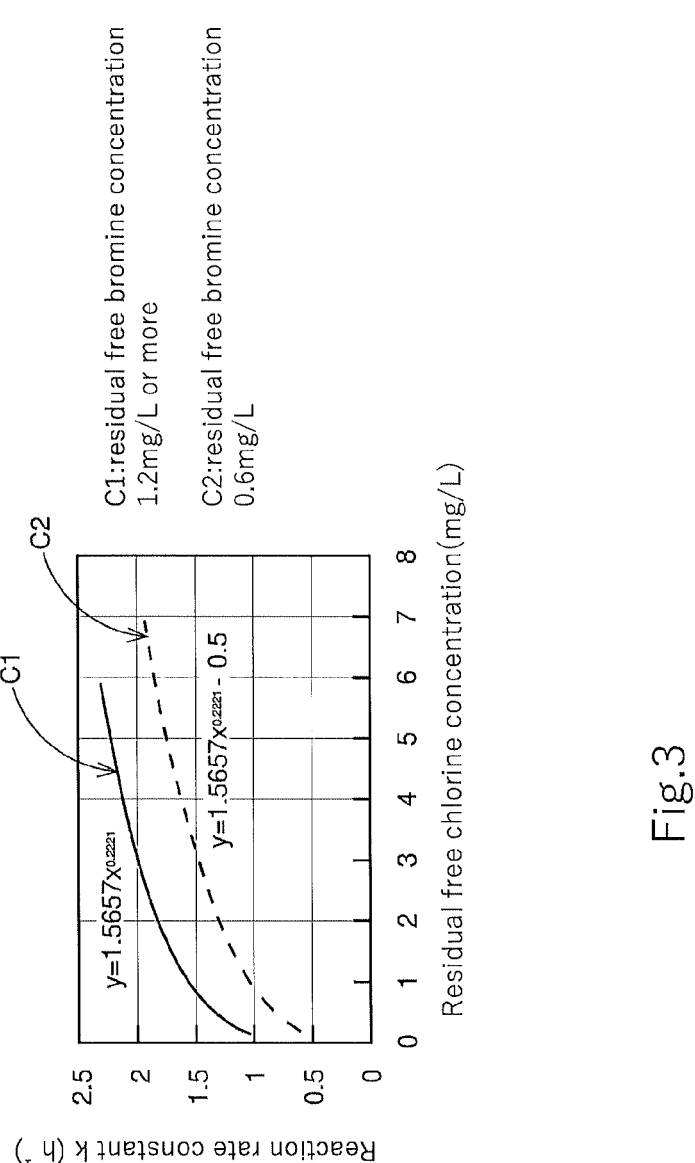
FIG. 3: The graph shows the correlation between the residual free chlorine concentration and the residual free bromine concentration and the reaction rate constant.

The relationship between the residual chlorine and residual free bromine concentrations obtained in preliminary tests and the reaction rate constants is shown in FIG. 3.

According to FIG. 3, the reaction rate constant is constant at residual free bromine concentrations above 1.2 mg/L. That is, it does not affect the rate of urea decomposition. Therefore, the minimum value of 1.2 mg/L can be set as the target residual free bromine concentration. In the course of this preliminary test, it was confirmed that the concentration of NaBr added to the pre-treated water multiplied by a predetermined value in the range of 0.5 to 0.7 (0.64 to 0.90 for Br conversion) can be adopted as the residual bromine concentration in the treated water.

Urea Decomposition Treatment Experiment

NaBr and NaClO were added to the pre-treated water (urea concentration 100 μg/L, 0.6 L) contained in a water tank so that the concentration in the treated water was 1 mg/L each and stirred for 3 minutes. The treated water after the reaction was measured with a residual chlorine meter (product name: Portable Digital Residual Chlorine Meter HI96711C, Hanna Instruments Japan Co). An indicated value of residual chlorine meter was 0.8 mg/L.

Next, 1 g/L of glycine (Kanto Chemical Co., Ltd.) was added to the treated water, and after stirring for 1 minute, the treated water was measured with a residual chlorine meter, and the value indicated by the residual chlorine meter was 0.6 mg/L. Thus, the residual free bromine concentration in the treated water is 0.6 mg/L. The total concentration of residual free bromine and residual free chlorine in the treated water is 0.8 mg/L, so the residual free chlorine concentration in the treated water is 0.8-0.6=0.2 mg/L.

Here, to decompose urea so that the urea concentration goes from 100 μg/L to 1 μg/L in 3 hours, the reaction rate constant k must be 1.54 $h^{-1}$ from Equation 4 ($C=C_0 e^{-kt}$). According to the graph of curve C1 in FIG. 3, the reaction rate constant is constant (i.e., it does not affect the decomposition rate of urea) at residual free bromine concentrations above 1.2 mg/L. Therefore, when the minimum value, 1.2 mg/L, is set as the target residual free bromine concentration, the target residual free chlorine concentration at the reaction rate constant k=1.54 $h^{-1}$, the target residual free chlorine concentration is 0.9 mg/L. Therefore, since the free bromine concentration in the treated water is 0.6 mg/L and the free chlorine concentration is 0.2 mg/L, it can be seen that to decompose urea so that the urea concentration goes from 100 μg/L to 1 μg/L in 3 hours, the free bromine concentration in the treated water must be increased by 1.2-0.6=0.6 mg/L and the free chlorine concentration must be increased by 0.9-0.2=0.7 mg/L as NaBr and NaClO.

If the amount of NaBr to be added is to be reduced, the graph of curve C2 in FIG. 3 shows that when the residual free bromine concentration is set at 0.6 mg/L, the residual free chlorine concentration at reaction rate constant k=1.54 $h^{-1}$ is 3.3 mg/L. Therefore, since the free bromine concentration in the treated water is 0.6 mg/L and the free chlorine concentration is 0.2 mg/L, to decompose urea so that the urea concentration goes from 100 μg/L to 1 μg/L in 3 hours, the free bromine concentration in the treated water is 0.6-0.6=0 mg/L and the free chlorine concentration is 3.3-0.2=3.1 mg/L as NaBr and NaClO.

Next, initially added 1 mg/L of NaBr and 1 mg/L NaClO were increased to so that the residual free bromine and residual free chlorine concentrations in the pre-treated water, as determined above, by 0.6 mg/L and 0.7 mg/L, respectively. As a result, it took 2.9 hours for a urea concentration of 100 μg/L in the pre-treated water to be decomposed to 1 μg/L. Similarly, NaBr and NaClO were increased so that the residual free bromine and residual free chlorine concentrations in the treated water, as determined above, by 0.4 mg/L and 4.8 mg/L, respectively. As a result, it took 3.0 hours for a urea concentration of 100 μg/L in the pre-treated water to be decomposed to 1 μg/L.

Example 2

As in Example 1, urea was added to tap water from Sagamihara City to make a urea concentration of 100 μg/L to obtain pre-treated water. To the pre-treated water (urea concentration 100 μg/L, 0.6 L) contained in a water tank, 6 mg/L of NaBr and 6 mg/L of NaClO were added and stirred for 3 minutes. The treated water after the reaction was measured with a residual chlorine meter (product name: Portable Digital Residual Chlorine Meter HI96711C, Hanna Instruments Japan Co). The indicated value of the residual chlorine meter was 4.8 mg/L.

Next, glycine (manufactured by Kanto Chemical Co., Ltd.) was added to the treated water so that the concentration of glycine was 1 g/L. After stirring for 1 minute, the treated water was measured with a residual chlorine meter, and the value indicated by the residual chlorine meter was 3.6 mg/L. Thus, the residual free bromine concentration in the treated water is 3.6 mg/L. The total concentration of residual free bromine and residual free chlorine in the treated water is 4.8 mg/L, so the residual free chlorine concentration in the treated water is 4.8-3.6=1.2 mg/L.

Here, to decompose urea so that the urea concentration goes from 100 μg/L to 1 μg/L in 2.5 hours, the reaction rate constant k must be 1.84 $h^{-1}$ from Equation 4 ($C=C_0 e^{-kt}$). And according to the graph of curve C1 in FIG. 3, the reaction rate constant is constant (i.e., it does not affect the rate of urea decomposition) at residual free bromine concentrations above 1.2 mg/L, so when the reaction rate constant is set at its minimum value of 1.2 mg/L, the reaction rate constant k=1.84 $h^{-1}$, the residual free chlorine concentration is 2.1 mg/L. Therefore, since the residual free bromine concentration in the treated water is 3.6 mg/L and the residual free chlorine concentration is 1.2 mg/L, to decompose urea so that the urea concentration goes from 100 μg/L to 1 μg/L in 2.5 hours, the free bromine concentration in the treated water is 1.2-3.6=-2.4 mg/L, meaning that the amount of NaBr added must be reduced by the amount that decreases 2.4 mg/L, and NaClO must be added by the amount that increases the free chlorine concentration by 2.1-1.2=0.9 mg/L.

Next, the amount of NaBr and NaClO added was increased or decreased to the initial addition of NaBr 6 mg/L and NaClO 6 mg/L so that the residual free bromine concentration in the treated water determined above decreased by 2.4 mg/L and the residual free chlorine concentration increased by 0.9 mg/L. As a result, it took 2.4 hours for a urea concentration of 100 μg/L in the pre-treated water to be decomposed to 1 μg/L.

Example 3

As in Example 1, urea was added to tap water from Sagamihara City to make a urea concentration of 100 μg/L to obtain the pre-treated water. The pre-treated water (urea concentration 100 μg/L, 0.6 L) contained in a water tank, 1 mg/L of NaBr and 1 mg/L of NaClO were added and stirred for 3 minutes. The treated water after the reaction was measured with a residual chlorine meter (product name: Portable Digital Residual Chlorine Meter HI96711C, Hanna Instruments Japan Co). The indicated value of residual chlorine meter was 0.8 mg/L.

Here, the value obtained by multiplying the concentration of NaBr added to the pre-treated water by a predetermined value within the range of 0.5-0.7 (0.64-0.90 for Br⁻ conversion) can be adopted as the residual free bromine concentration in the treated water. For example, if the value obtained by multiplying the concentration of NaBr added to the pre-treated water by 0.6 is used as the residual free bromine concentration in the treated water, the residual free bromine concentration in the treated water is 0.6 mg/L and the residual free chlorine concentration is 0.8-0.6=0.2 mg/L.

Here, to decompose urea so that the urea concentration goes from 100 μg/L to 1 μg/L in 3 hours, the reaction rate constant k must be 1.54 h⁻¹ from Equation 4 ($C=C_0e^{-kt}$). According to the graph of curve C1 in FIG. 3, the reaction rate constant is constant (i.e., it does not affect the decomposition rate of urea) at residual free bromine concentrations above 1.2 mg/L. Therefore, when the minimum value of 1.2 mg/L is set as the target residual bromine concentration, the target residual bromine concentration when the reaction rate constant k=1.54 h⁻¹, the target residual free chlorine concentration is 0.9 mg/L. Therefore, since the free bromine concentration in the treated water is 0.6 mg/L and the free chlorine concentration is 0.2 mg/L, it can be seen that to decompose urea so that the urea concentration goes from 100 μg/L to 1 μg/L in 3 hours, the free bromine concentration in the treated water must be increased by 1.2-0.6=0.6 mg/L and the free chlorine concentration in the treated water must be increased by 0.9-0.2=0.7 mg/L as NaBr and NaClO.

Comparison Example 1

To pre-treated water (urea concentration 100 μg/L, 0.6 L) contained in a water tank, 9 mg/L of NaBr and 3 mg/L of NaClO were added and stirred for 3 minutes. The treated water after the reaction was measured with a residual chlorine meter (product name: Portable Digital Residual Chlorine Meter HI96711C, Hanna Instruments Japan Co) and indicated value was 1.8 mg/L. It took 4.5 hours to decompose urea in the pre-treated water from 100 μg/L to 1 μg/L. According to this, the indicated value of the residual chlorine meter of the treated water would indicate that there is enough chlorine to decompose urea, but in reality, the indicated value of the residual chlorine meter was expressed as a total value of 1.8 mg/L free bromine concentration and 0 mg/L free chlorine concentration, so the amount of NaClO was not enough and it is assumed that the urea decomposition took a long time.

DESCRIPTION OF SIGNS

1 Urea treatment device
2 Urea decomposition tank
3 Residual chlorine meter
4 Means of control
11 Bromide salt addition means
12 Chlorine-based oxidizer addition means

The invention claimed is:

1. A urea treatment method in which a bromide salt and a chlorine-based oxidant are added to pre-treated water containing urea to generate hypobromite ions to decompose urea in the pre-treated water to obtain treated water comprising:

(a) determining the concentration of residual free bromine and residual free chlorine in said treated water, respectively; and (b) controlling the amount of bromide salt and chlorine-based oxidizer added based on the residual free bromine and the residual free chlorine concentrations;

wherein said process (a) comprises:

(a1) measuring samples taken from said treated water with a residual chlorine meter, (a2) adding a compound having an amino group to a sample taken from said treated water, and measuring the resulting sample with a residual chlorine meter to obtain the concentration of residual free bromine in said resulting sample, and (a3) calculating the residual free chlorine concentration from the difference between the residual chlorine meter reading obtained in process (a1) and the residual free bromine concentration obtained in process (a2);

wherein said process (b) comprises:

(b1) determining the required residual free bromine concentration and the required residual free chlorine concentration in the treated water required to achieve the preset target urea concentration and target reaction time, (b2) increasing or decreasing the amount of bromide salt added by the difference between the residual free bromine concentration determined in process (a2) and the required residual free bromine concentration determined in process (b1), and (b3) increasing or decreasing the amount of chlorine-based oxidizing agent added by the difference between the residual free chlorine concentration determined in process (a3) and the required residual free chlorine concentration determined in process (b1);

wherein prior to the process (a), the correlation between the residual free chlorine concentration in the pre-treated water, the residual free bromine concentration in the pre-treated water, and the reaction rate constant of the urea decomposition reaction is determined by calculating the reaction rate constant of the urea decomposition reaction through multiple preliminary tests in which the amount of bromide salt added to the pre-treated water and the amount of chlorine-based oxidizing agent are varied as parameters; and wherein said process (b1) comprises:

(b1-1) determining the reaction rate constants required to achieve these target urea concentrations and target reaction times based on the urea concentration in the pre-treated water before the addition of the bromide salt and chlorine-based oxidant, and (b1-2) determining the residual free chlorine concentration of the required treated water using the correlation between the reaction rate constant determined in process (b1-1) and the residual free bromine concentration determined in process (a).

2. The urea treatment method according to claim 1, wherein the compound having an amino group is glycine.

3. The urea treatment method according to claim 1, wherein the compound having an amino group is selected from the group consisting of glycine, arginine, asparagine, glutamine, lysine, phenylalanine, proline, serine, and taurine.

4. The urea treatment method according to claim 1, wherein the compound having an amino group is an amino acid or an aminoalkyl sulfonic acid.

5. A urea treatment method in which a bromide salt and a chlorine-based oxidant are added to pre-treated water containing urea to generate hypobromite ions to decompose urea in the pre-treated water to obtain treated water comprising:

(a) determining the concentration of residual free bromine and residual free chlorine in said treated water, respectively; and (b) controlling the amount of bromide salt and chlorine-based oxidizer added based on the residual free bromine and the residual free chlorine concentrations;

wherein said process (a) comprises:

(a1) measuring samples taken from said treated water with a residual chlorine meter, (a2) adding a compound having an amino group to a sample taken from said treated water, and measuring the resulting sample with a residual chlorine meter to obtain the concentration of residual free bromine in said resulting sample, and (a3) calculating the residual free chlorine concentration from the difference between the residual chlorine meter reading obtained in process (a1) and the residual free bromine concentration obtained in process (a2);

wherein said process (b) comprises:

(b1) determining the required residual free bromine concentration and the required residual free chlorine concentration in the treated water required to achieve the preset target urea concentration and target reaction time, (b2) increasing or decreasing the amount of bromide salt added by the difference between the residual free bromine concentration determined in process (a2) and the required residual free bromine concentration determined in process (b1), and (b3) increasing or decreasing the amount of chlorine-based oxidizing agent added by the difference between the residual free chlorine concentration determined in process (a3) and the required residual free chlorine concentration determined in process (b1);

wherein prior to the process (a), the correlation between the residual free chlorine concentration in the pre-treated water, the residual free bromine concentration in the pre-treated water, and the reaction rate constant of the urea decomposition reaction is determined by calculating the reaction rate constant of the urea decomposition reaction through several preliminary tests in which the amount of bromide salt added to the pre-treated water is kept constant and the amount of chlorine-based oxidant is varied as a parameter; and wherein said process (b1) comprises:

(b1-1) determining the reaction rate constants required to achieve these target urea concentrations and target reaction times based on the urea concentration in the pre-treated water before the addition of the bromide salt and chlorine-based oxidant, and (b1-2) determining the residual free chlorine concentration of the required treated water using the correlation between the reaction rate constant determined in process (b1-1) and the residual free bromine concentration determined in process (a).

6. The urea treatment method according to claim 5, wherein the compound having an amino group is selected from the group consisting of glycine, arginine, asparagine, glutamine, lysine, phenylalanine, proline, serine, and taurine.

7. The urea treatment method according to claim 5, wherein the compound having an amino group is an amino acid or an aminoalkyl sulfonic acid.

8. The urea treatment method according to claim 5, wherein the compound having an amino group is glycine.

9. A urea treatment method in which a bromide salt and a chlorine-based oxidant are added to pre-treated water containing urea to generate hypobromite ions to decompose urea in the pre-treated water to obtain treated water comprising:

(a) determining the concentration of residual free bromine and residual free chlorine in said treated water, respectively; and (b) controlling the amount of bromide salt and chlorine-based oxidizer added based on the residual free bromine and the residual free chlorine concentrations;

wherein said process (a) comprises:

(a1) measuring a sample taken from said treated water with a residual chlorine meter, (a2') calculating the concentration of residual free bromine in the sample by multiplying the amount of bromide salt added to the treated water by a predetermined value in the range of 0.5 to 0.7, and (a3) calculating the residual free chlorine concentration from the difference between the residual chlorine meter reading obtained in process (a1) and the residual free bromine concentration calculated in process (a2').

10. The urea treatment method according to claim 9, wherein the process (b) comprises:

(b1) determining the required residual free bromine concentration and required residual free chlorine concentration in the treated water required to achieve the preset target urea concentration and target reaction time, (b2) increasing or decreasing the amount of bromide salt added by the difference between the residual free bromine concentration determined in process (a2') and the required residual free bromine concentration determined in process (b1), and (b3) increasing or decreasing the amount of chlorine-based oxidizing agent added by the difference between the residual free chlorine concentration determined in process (a3) and the required residual free chlorine concentration determined in process (b1).

11. The urea treatment method according to claim 10, wherein prior to the process (a), the correlation between the residual free chlorine concentration in the pre-treated water, the residual free bromine concentration in the pre-treated water, and the reaction rate constant of the urea decomposition reaction is determined by calculating the reaction rate constant of the urea decomposition reaction through multiple preliminary tests in which the amount of bromide salt added to the pre-treated water and the amount of chlorine-based oxidizing agent are varied as parameters, and said process (b1) comprises:

(b1-1) determining the reaction rate constants required to achieve these target urea concentrations and target reaction times based on the urea concentration in the pre-treated water before the addition of the bromide salt and chlorine-based oxidant, and (b1-2) determining the residual free chlorine concentration of the required treated water using the correlation between the reaction rate constant determined in process (b1-1) and the residual free bromine concentration determined in process (a).

12. The urea treatment method according to claim 10, wherein prior to the process (a), the correlation between the residual free chlorine concentration in the pre-treated water, the residual free bromine concentration in the pre-treated water, and the reaction rate constant of the urea decomposition reaction is determined by calculating the reaction rate constant of the urea decomposition reaction through several preliminary tests in which the amount of bromide salt added to the pre-treated water is kept constant and the amount of chlorine-based oxidant is varied as a parameter, and said process (b1) comprises:

(b1-1) determining the reaction rate constants required to achieve these target urea concentrations and target reaction times based on the urea concentration in the pre-treated water before the addition of the bromide salt and chlorine-based oxidant, and (b1-2) determining the residual free chlorine concentration of the required treated water using the correlation between the reaction rate constant determined in process (b1-1) and the residual free bromine concentration determined in process (a).

* * * * *